(12) United States Patent
White et al.

(10) Patent No.: US 12,624,131 B2
(45) Date of Patent: May 12, 2026

(54) METHODS FOR PRODUCING POLYISOPRENE LATEX DISPERSIONS

(71) Applicant: Bridgestone Corporation, Tokyo (JP)

(72) Inventors: Robert W. White, Gilbert, AZ (US); Michael R. Hartzell, Gold Canyon, AZ (US); Mark N. Dedecker, North Canton, OH (US); Jason K. Kwan, Mesa, AZ (US)

(73) Assignee: Bridgestone Corporation, Chuo-ku (JP)

( * ) Notice: Subject to any disclaimer, the term of this patent is extended or adjusted under 35 U.S.C. 154(b) by 731 days.

(21) Appl. No.: 18/001,613

(22) PCT Filed: Jun. 14, 2021

(86) PCT No.: PCT/US2021/037282
§ 371 (c)(1),
(2) Date: Dec. 13, 2022

(87) PCT Pub. No.: WO2021/257482
PCT Pub. Date: Dec. 23, 2021

(65) Prior Publication Data
US 2023/0220124 A1    Jul. 13, 2023

Related U.S. Application Data

(60) Provisional application No. 63/112,128, filed on Nov. 10, 2020, provisional application No. 63/038,883, filed on Jun. 14, 2020.

(51) Int. Cl.
*C08C 2/02*     (2006.01)
*C08C 1/10*     (2006.01)
*C08J 3/07*     (2006.01)
*C08K 5/42*     (2006.01)

(52) U.S. Cl.
CPC ................. *C08C 2/02* (2013.01); *C08C 1/10* (2013.01); *C08J 3/07* (2013.01); *C08K 5/42* (2013.01); *C08J 2307/02* (2013.01)

(58) Field of Classification Search
CPC .... C09D 109/10; C08J 2307/02; B01D 11/02; B01D 11/0284; B01D 17/041
See application file for complete search history.

(56) References Cited

U.S. PATENT DOCUMENTS

| | | | |
|---|---|---|---|
| 3,250,737 A | 5/1966 | Halper et al. | |
| 6,054,525 A * | 4/2000 | Schloman, Jr. ........... | C08L 7/02 |
| | | | 524/925 |
| 2004/0031086 A1* | 2/2004 | Huynh ....................... | C08J 5/02 |
| | | | 2/161.7 |
| 2009/0234064 A1 | 9/2009 | Wang et al. | |
| 2009/0281211 A1 | 11/2009 | Van Der Huizen et al. | |
| 2021/0079148 A1 | 3/2021 | Nakamura et al. | |

FOREIGN PATENT DOCUMENTS

| | | |
|---|---|---|
| CN | 102604304 A | 7/2012 |
| EP | 3378895 A1 | 9/2018 |
| JP | 2019-035065 A | 3/2019 |
| WO | 2008074513 A1 | 6/2008 |
| WO | 2019-138449 A1 | 9/2019 |

OTHER PUBLICATIONS

Extended European Search Report dated Jun. 6, 2024 for Application No. 21825477.9 (9 pp).
Schloman et al: "Processing guayule for latex and bulk rubber", Industrial Crops and Products, Elsevier, NL, vol. 22, No. 1, Jul. 1, 2005 (Jul. 1, 2005), pp. 41-47.
International Search Report and Written Opinion for corresponding PCT/US2021/037282 dated Oct. 19, 2021 (13 pp).
Examination report No. 1 issued by IP Australia for related AU application No. 2021292473 dated Dec. 22, 2023.
Schloman, W W et al. "Semisynthetic guayule latex with reduced allergenicity", Industrial Crops and Products, 1997, vol. 7, pp. 27-36.

* cited by examiner

*Primary Examiner* — Christopher M Rodd
(74) *Attorney, Agent, or Firm* — Meredith E. Hooker; Arthur M. Reginelli

(57)    ABSTRACT

In various embodiments, methods for producing aqueous polyisoprene latex from natural cis-1,4-polyisoprene are described. The natural cis-1,4-polyisoprene may be sourced from guayule scrubs. In various embodiments, the method comprises extracting guayule plant material to form a miscella, fractionating the miscella to a preliminary cement, diluting the preliminary cement to a cement for dispersing, dispersing the cement in an aqueous surfactant mixture under high shear to produce an emulsion, and de-solventizing the emulsion to produce an aqueous latex dispersion. The rubber solids level can then be adjusted by centrifugation and dilution in water to produce a final aqueous cis-1, 4-polyisoprene latex.

7 Claims, 2 Drawing Sheets

100

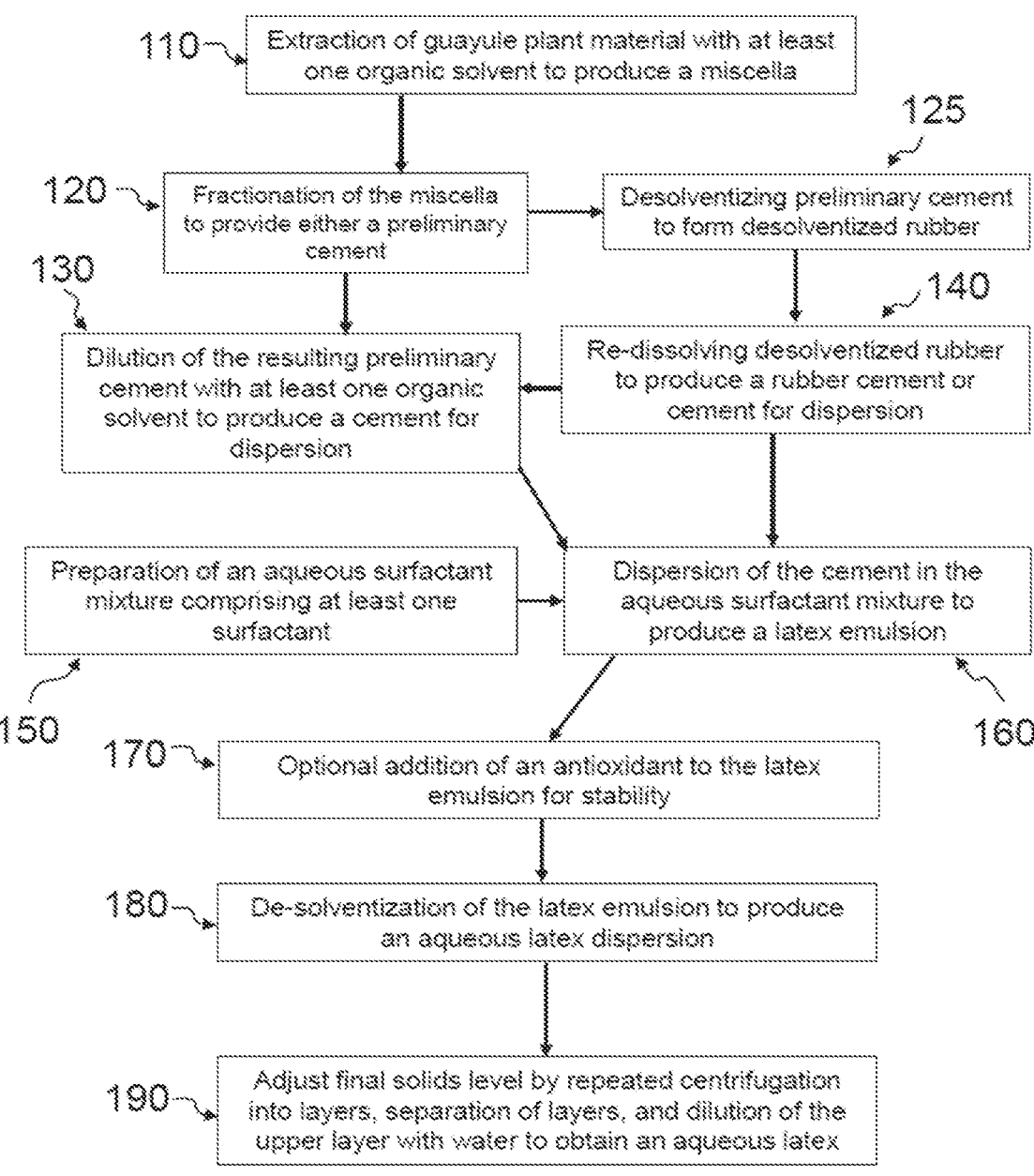

110 — Extraction of guayule plant material with at least one organic solvent to produce a miscella 120 — Fractionation of the miscella to provide either a preliminary cement 125 — Desolventizing preliminary cement to form desolventized rubber 130 — Dilution of the resulting preliminary cement with at least one organic solvent to produce a cement for dispersion 140 — Re-dissolving desolventized rubber to produce a rubber cement or cement for dispersion 150 — Preparation of an aqueous surfactant mixture comprising at least one surfactant 160 — Dispersion of the cement in the aqueous surfactant mixture to produce a latex emulsion 170 — Optional addition of an antioxidant to the latex emulsion for stability 180 — De-solventization of the latex emulsion to produce an aqueous latex dispersion 190 — Adjust final solids level by repeated centrifugation into layers, separation of layers, and dilution of the upper layer with water to obtain an aqueous latex

FIG. 1

METHODS FOR PRODUCING POLYISOPRENE LATEX DISPERSIONS

This application is a National-Stage application of PCT/US2021/037282 filed on Jun. 14, 2021, which claims the benefit of U.S. Provisional Application Ser. No. 63/038,883 filed on Jun. 14, 2020, and U.S. Provisional Application Ser. No. 63/112,128 filed on Nov. 10, 2020, which are incorporated herein by reference.

FIELD OF THE INVENTION

The present disclosure generally relates to polyisoprene latex and in particular to methods of preparing latex dispersions from natural polyisoprene.

BACKGROUND

Natural rubber provides products having remarkable resilience, heat resistance and tensile strength. For at least these reasons, tires may be produced from natural rubber rather than synthetic rubber. Out of the four possible isomers of polyisoprene, natural rubber is entirely cis-1,4-polyisoprene. Pure polymer chains of cis-1,4-polyisoprene form aligned polymer chains, resulting in these remarkable properties.

Polyisoprene latex dispersions are useful in the manufacture of dipped products such as wetsuits, condoms, gloves, catheters, angioplasty balloons; to make medical devices or laboratory equipment; for making adhesives for medical and cosmetics uses; as well as in coatings, including those useful for tire applications. The dip molding process in particular relies on using rubber latex dispersions having certain physical and chemical properties to allow for optimization of variables in the process, e.g., dwell time in the latex, leach dip conditions, curing and finishing.

In spite of the long history of natural polyisoprene rubber and latex dispersions comprising cis-1,4-polyisoprene, various industries would benefit from having reliable sources of stable polyisoprene latex dispersions having optimized polymer chain distributions, color, viscosity, and weight percent solids. What is still lacking is a latex process that provides a cis-1,4-polyisoprene latex dispersion having properties optimized for dip-molding.

SUMMARY

In accordance with various embodiments of the present disclosure, a process for producing cis-1,4-polyisoprene latex dispersions is described. In various embodiments, the cis-1,4-polyisoprene latex dispersions produced by the methods herein comprise hypoallergenic semi-synthetic guayule latex.

In various embodiments of the present disclosure, a method of producing a cis-1,4-polyisoprene latex dispersion is described. The method is characterized by the steps of dispersing a cis-1,4-polyisoprene rubber cement of a particular weight percent solids into an aqueous surfactant mixture to produce an emulsion, followed by de-solventization of the emulsion to produce an aqueous latex dispersion. In various embodiments, the cement comprises cis-1,4-polyisoprene rubber dissolved in at least one organic solvent. In various embodiments, the de-solventization comprising removing the at least one organic solvent from the emulsion to produce the polyisoprene latex dispersion. The resulting latex dispersion may then be subjected to weight percent solids adjustment, such as by subjecting the latex dispersion obtained by de-solventization to at least one round of centrifugation into phases, phase separation, and dilution of the high solids phase, to adjust solids level to a final targeted weight percent solids.

In various embodiments, a method for producing an aqueous polyisoprene latex comprises: dispersing a cement comprising cis-1,4-polyisoprene rubber dissolved in an organic solvent into an aqueous surfactant mixture to produce a latex emulsion, where said dispersing takes place at a shear rate of greater than 20,000 rad/sec; and removing at least one organic solvent from the latex emulsion to produce the aqueous polyisoprene latex.

In various embodiments, a method for producing an aqueous polyisoprene latex comprises: extracting guayule plant material with a solvent to obtain a preliminary cement comprising cis-1,4-polyisoprene rubber dissolved in the at least one organic solvent; diluting the preliminary cement with at least one organic solvent to produce a cement; dispersing the cement into an aqueous surfactant mixture to produce a latex emulsion; de-solventizing the latex emulsion to produce an aqueous polyisoprene latex dispersion; and adjusting a weight percent solids level of the aqueous latex dispersion to produce the aqueous polyisoprene latex.

In various embodiments, a method for producing an aqueous polyisoprene latex comprises: extracting guayule plant material with at least one organic solvent to obtain a miscella; fractionating the miscella to obtain a preliminary cement comprising cis-1,4-polyisoprene rubber in the at least one organic solvent; diluting the preliminary cement with at least one organic solvent to produce a cement; dispersing the cement into an aqueous surfactant mixture to produce a latex emulsion; de-solventizing the latex emulsion to produce an aqueous polyisoprene latex dispersion; and adjusting a weight percent solids level of the aqueous latex dispersion to produce the aqueous polyisoprene latex.

In various embodiments, a method for producing an aqueous polyisoprene latex comprises: extracting guayule plant material with a solvent to obtain a miscella; fractionating the miscella to obtain a swollen rubber mass; dissolving the swollen rubber mass in at least one organic solvent to obtain a preliminary cement; diluting the preliminary cement with at least one organic solvent to produce a cement; dispersing the cement into an aqueous surfactant mixture to produce a latex emulsion; and removing the organic solvent latex emulsion to produce the polyisoprene latex dispersion.

BRIEF DESCRIPTION OF THE DRAWINGS

FIG. 1 sets forth a flowchart of steps usable in producing a latex dispersion in accordance with various embodiments of the present disclosure.

DETAILED DESCRIPTION

Figure 2:
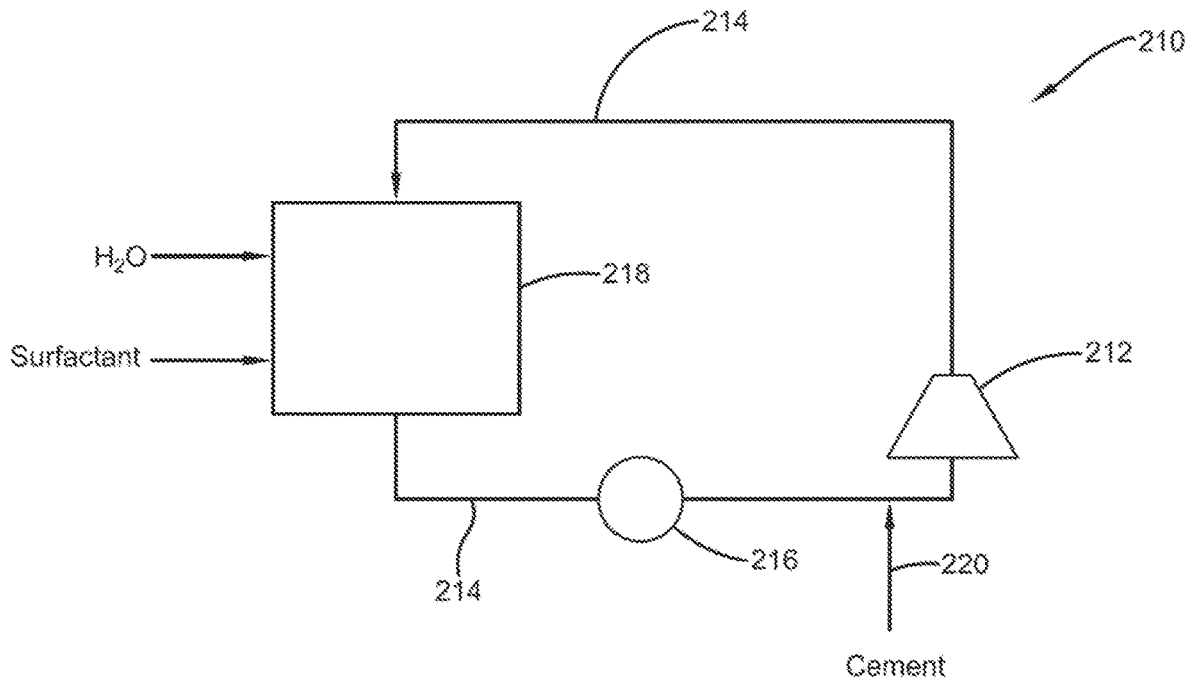
FIG. 2 is a schematic representation of a sub-system for dispersing rubber cement into an aqueous surfactant mixture.

Embodiments of the present disclosure are based, at least in part, on the discovery of methods for producing cis-1,4-polyisoprene latex dispersions. According to embodiments of the invention, rubber cements that include rubber obtained from guayule plant material are emulsified, and the latex dispersions are prepared from the emulsion by removal of hydrocarbon solvent. It has been unexpectedly discovered that the manner in which the rubber cement is emulsified leads to advantageous yield without a deleterious impact on polymer properties.

Definitions and Interpretations

As used herein, the term "natural polyisoprene" refers to a polymer consisting essentially of cis-1,4-polyisoprene. Pure cis-1,4-polyisoprene is found in various trees, shrubs and plants, e.g., *Hevea brasiliensis*, (i.e., the Amazonian rubber tree), *Castilla elastica* (i.e., the Panama rubber tree), various *Landophia* vines (*L. kirkii, L. heudelotis*, and *L. owariensis*), various dandelions (i.e., *Taraxacum* species of plants), and *Parthenium argentatum* (guayule shrubs). Although the present disclosure focuses on guayule as the source of the cis-1,4-polyisoprene used in various embodiments of a latex process herein, the processes disclosed herein should not be viewed as being limited to only guayule as the source for cis-1,4-polyisoprene.

As used herein, the term "natural latex" refers to the milky white, viscous sap obtained directly by tapping the *Hevea brasiliensis* rubber tree, since this sap naturally flows just under the tree bark. Although this natural latex can be manipulated afterwards to change some of its inherent properties, the material tapped from the *Hevea* tree tends to have far too many allergens present for practical use in dip-molding of medical gloves and condoms. Further, the trees are only indigenous to particular regions of the world outside the United States where access and supply may be an issue. Natural latex emulsions are outside the scope of the present disclosure.

As used herein, the term "semi-synthetic latex" refers to an aqueous dispersion of natural polyisoprene. In other words, although the rubber starting material may be entirely naturally occurring cis-1,4-polyisoprene, the process of forming the latex dispersion involves chemical processes rather than simple tapping of a tree. The present disclosure describes new methods for manufacturing a semi-synthetic latex from natural cis-1,4-polyisoprene obtained from the guayule plant. Guayule is a poor source for natural latex because any latex naturally present in the shrub is trapped intracellularly in the plant cells (not intercellularly), and thus the plant cells must be ruptured to obtain any natural latex, unlike the *Hevea* tree.

As used herein, the term "synthetic latex" refers to an aqueous dispersion of synthetic polyisoprene. Synthetic polyisoprene is prepared by polymerizing isoprene $C_5H_8$ in the presence of various catalysts, e.g., in anionic chain or coordinative chain polymerization reactions, optionally as part of emulsion polymerization. Synthetic polyisoprene typically contains one or more of the other three isomers of polyisoprene, namely trans-1,4-, 3,4-addition, and 1,2-addition, although with certain catalysts, (e.g., the Ziegler-Natta catalyst $TiCl_4/Al(i-C_4H_9)_3$, polyisoprene having >90% cis-1,4-monomers can be synthesized. Synthetic latex emulsions are outside the scope of the present disclosure.

As used herein, the term "cement" refers to a rubber cement, which is a solution comprising polyisoprene dissolved in an organic solvent. In various embodiments, a cement may comprise a single organic solvent (e.g., cyclohexane, acetone), or a blend of solvents as the diluent for the rubber.

As used herein, the term "dispersion" takes on its ordinary meaning in chemistry referring to a homogeneous mixture of fine solid particles in a liquid. Strictly speaking, an "emulsion" is a mixture of fine droplets of liquid in an immiscible liquid, e.g., an oil-in-water emulsion. Although a cis-1,4-polyisoprene aqueous latex is technically a dispersion of fine rubber particles, the terms dispersion and emulsion tend to get interchanged in the art without regard to whether it might be solid particles or liquid droplets finely dispersed in a liquid carrier. Further, an oil may be "dispersed" in water to form an "emulsion." The methods disclosed herein technically disclose both emulsions and dispersions. For example, a rubber cement, which is a solution of rubber dissolved in an organic solvent, is dispersed into an aqueous solution to produce an emulsion. The resulting emulsion may then be de-solventized to produce an aqueous latex dispersion.

As used herein, the plural "s," when used in conjunction with a hydrocarbon, e.g., pentanes or hexanes, infers a mixture of isomers of the hydrocarbon, recognizing that some technical grades of low boiling hydrocarbons are mixtures of isomers. Thus, for example, the term "pentanes" indicates a mixture of hydrocarbons comprising n-pentane, iso-pentane and neo-pentane.

Characteristics of Latex

The latex dispersions prepared according to embodiments of this disclosure are characterized by including an aqueous dispersion rubber obtained from guayule plant material. This rubber may also be referred to herein as cis-1,4-polyisoprene, natural cis-1,4-polyisoprene, or guayule rubber.

The latex dispersions prepared according to embodiments of this disclosure are characterized by a mechanical stability, as measured according to ASTM D1076-15 (2020), of greater than 650 seconds, alternatively greater than 1000 seconds, in other embodiments greater than 1500 seconds, in still other embodiments greater than 2000 seconds, and further still greater than 2500 seconds.

The latex dispersion prepared according to embodiments of this disclosure are characterized by including rubber having a number average molecular weight (Mn), as measured by gel permeation chromatography using polystyrene standards, of greater than 200 kg/mol (i.e. Daltons), in other embodiments greater than 250 kg/mol, in other embodiments greater than 300 kg/mol, and in other embodiments from about 200 to about 500 kg/mol. In these or other embodiments, the latex dispersions are characterized by including rubber having a weight average molecular weight (Mw), as measured by gel permeation chromatography using polystyrene standards, of greater than 750 kg/mol, in other embodiments greater than 800 kg/mol, in other embodiments greater than 850 kg/mol, and in other embodiments from about 750 to about 1,700 kg/mol. In these or other embodiments, the latex dispersions are characterized by including rubber having a molecular weight distribution (Mw/Mn) of from about 1.5 to about 5 or in other embodiments from about 2 to about 4.

The latex dispersions prepared according to embodiments of this disclosure are characterized by including less than about 1 wt % protein content, which is indicative of low antigenic protein content. The latex dispersions prepared according to embodiments of this disclosure have a total protein content, as measured according to ASTM D5712-2020, of less than or equal to about 200 µg/dm² (micrograms per square decimeter of surface area), in other embodiments less than or equal to about 100 µg/dm², in yet other embodiments less than or equal to about 50 µg/dm², and in still other embodiments less than or equal to about 30 µg/dm².

The latex dispersions prepared according to embodiments of this disclosure have a an antigenic protein content, as measured according to ASTM D6499-2018, of less than or equal to about 2 µg/dm², in other embodiments less than or equal to about 1 µg/dm², in yet other embodiments less than or equal to about 0.5 µg/dm², and in still other embodiments less than or equal to about 0.25 µg/dm².

5               6

The latex dispersions prepared according to embodiments of this disclosure can be characterized by their particle size, which can be measured by employing scanning transmission electron microscopy with a HAADF detector using dark field and bright field images. In one or more embodiments, the latex dispersions prepared according to embodiments of this disclosure have a mean particle size that is greater than 200 nm, in other embodiments greater than 300 nm, and in other embodiments greater than 400 nm. In these or other embodiments, the latex dispersions prepared according to embodiments of this disclosure have a mean particle size that is less than 2000 nm, in other embodiments less than 1800 nm, and in other embodiments less than 1500 nm. In one or more embodiments, the latex dispersions prepared according to embodiments of this disclosure have a mean particle size of from about 200 to about 2000 nm, in other embodiments from about 300 to about 1800, and in other embodiments from about 400 to about 1500 nm. In one or more embodiments, the latex dispersions prepared according to embodiments of this disclosure have a particle size mode that is greater than 40 nm, in other embodiments greater than 100 nm, in other embodiments greater than 150 nm, and in other embodiments greater than 200 nm. In these or other embodiments, the latex dispersions prepared according to embodiments of this disclosure have a particle size mode that is less than 1000 nm, in other embodiments less than 900 nm, and in other embodiments less than 750 nm. In one or more embodiments, the latex dispersions prepared according to embodiments of this disclosure have a particle size mode of from about 40 to about 1000 nm, in other embodiments from about 150 to about 900, and in other embodiments from about 200 to about 750 nm.

The latex dispersions prepared according to embodiments of this disclosure can be characterized by an advantageously low resin content. The skilled person understands that latex dispersions derived from the guayule plant contain guayule resin, which includes monoterpenes, triterpenes (Argentatin A, B and C), sesquiterpene compounds (Guayulin A and B) and fatty acids (as free fatty acid, monoglycerides, diglycerides, triglycerides, or a combination thereof). The skilled person also understands that these resins have a plasticizing effect on natural rubber, and fatty acid triglycerides can facilitate oxidative degradation of the latex. The latex dispersions prepared according to embodiments of this disclosure have a resin content, as measured according GPC using polystyrene standards, of less than or equal to of about 2.0%, in other embodiments less than or equal to about 1.5%, and in alternative embodiments less than or equal to about 1.2 wt %.

The latex dispersions prepared according to embodiments of this disclosure can be characterized by an advantageously low content of molecules having a molecular weight of less than 1000 g/mol, which can be determined by using GPC with polystyrene standards. In one or more embodiments, the latexes include less than 7 wt %, in other embodiments less than 4 wt %, and in other embodiments less than 3 wt % of molecules having a molecular weight of less than 1000 g/mol.

The latex dispersions prepared according to embodiments of this disclosure are devoid or substantially devoid of thickeners, where substantially devoid refers that amount or less that does not have an appreciable impact on the latex or its use. The skilled person understands that thickeners that are used in latex dispersions include casein, alginates and cellulose. In one or more embodiments, the latex dispersions of this disclosure include less than 2 wt %, in other embodiments less than 0.5 wt %, and in other embodiments less than 0.1 wt % thickeners.

Preparation of Latex Dispersion

As indicated above, the latex dispersions according to embodiments of this disclosure are generally prepared by dispersing a rubber cement into an aqueous surfactant mixture. The rubber cement includes rubber extracted from guayule plant material. Processes for preparing the latex dispersions can be described with reference to FIG. 1. The starting point of the process may depend on the starting material. For example, if beginning with guayule plant material, the process may begin with extracting the plant. The steps of extracting plant material may vary depending on whether the cement is produced directly from guayule plant material or if a swollen rubber mass is obtained that has to be diluted with an organic solvent to provide the rubber cement. Where the cement is provided, the step or steps of extracting plant material may be eliminated.

As shown in FIG. 1, a method 100 for producing a latex dispersion in accordance with the present disclosure generally includes providing a cement for dispersion, which can include an optional step 110 of extracting guayule plant material with an organic solvent to obtain a miscella. In an optional step 120, the miscella is fractionated to produce a preliminary cement. In an optional step 130, the preliminary cement can be diluted with an organic solvent to produce a cement having suitable rubber solids content for dispersion. Alternatively, in an optional step 125, the cement is desolventized to produce a desolventized rubber. The desolventized rubber can be re-dissolved in a solved to from a rubber cement that requires further dilution in step 130 or a cement having suitable rubber solids content for dispersion. In either pathway, the rubber cement can be optimized to an appropriate rubber solids level, resin, and bagasse levels, that is suitable for dispersion.

With continued reference to FIG. 1, a step 150 includes the separate preparation of an aqueous surfactant mixture by dissolving a surfactant into water and adjusting the pH to with an alkali (i.e. a basic, ionic salt of an alkali metal or an alkaline earth metal). Step 150 is followed by a step 160 that includes dispersing the rubber cement and the aqueous surfactant mixture to produce an emulsion (i.e. a composition where the cement is dispersed in the aqueous phase). Formation of the emulsion is optionally followed by an optional step 170 that includes the optional addition of an antioxidant to the latex emulsion. Then, the emulsion is subjected to a step 180 that includes desolventizing the emulsion to produce an aqueous latex dispersion. Lastly, step 190 includes adjusting the final rubber solids level in the aqueous latex dispersion.

Optional Step of Extracting Plant Material

As indicated above, the methods of this disclosure optionally include methods for providing a preliminary cement by extracting guayule plant material. In various embodiments, extraction of guayule plant material may proceed by solvent extraction methods and may include any combination of regular solvent extraction and/or multistage fractionation, including counter-current multistage extraction and/or counter-current multistage fractionation processes. In various embodiments, guayule shrubs are harvested and the plant material dried to leave between about 5 wt % and 25 wt % moisture. With this processing, less than about 15%, or less than about 10% by weight of leaves may still remain on the dried shrubs.

In various embodiments, solvent extraction of guayule plant material may include chopping, grinding, macerating or otherwise breaking up dried guayule stems (optionally with <10-15 wt % of remaining leaves) in a solvent mixture including hydrocarbon solvent and a polar organic solvent to produce a miscella. The miscella can then be fractionated to obtain the preliminary cement. In various embodiments, the solvent mixture used for the regular extraction can include about 30 wt % acetone and 70 wt % hexanes.

In various embodiments, the step of fractionating the miscella includes adding a polar organic solvent to the miscella. In various embodiments, the step of fractioning the miscella may include multistage countercurrent fractionation with concomitant addition of a polar solvent (e.g. acetone) countercurrent to the flow of the miscella. At the end of the fractionator, the preliminary cement may include from about 10 wt % to about 25 wt % cis-1,4-polyisoprene rubber in solvent (e.g. a mixture of iso-hexane and acetone).

Methods for extracting guayule plant material to provide a preliminary cement are known in the art as described in U.S. Pat. Nos. 9,315,589B2, 9,637,562B2, 10,316,110B2, 11,028,188B2, 9,611,334B2, 9,890,262B2, 10,626,194B2, 10,112,123B2, 10,717,021B2, and 10,843,103B2, which are incorporated herein by reference.

In various embodiments, the preliminary cement from the fractionating step may include from about 0.1 wt % to about 8.0 wt % resin, in other embodiments from about 1 to about 5 wt %, and in other embodiments from about 1.5 to about 4 wt % resin based upon the total solids content of cement. In various embodiments, the preliminary cement includes less than 8.0 wt % resin, in other embodiments less than 6.0 wt % resin, in other embodiments less than 4.0 wt % resin, and in other embodiments less than 3.0 wt % resin based upon the total solids content of the cement. As those skilled in the art will appreciate, the amount of resin present in the preliminary cement can be determined by GPC using polystyrene standards.

In these or other embodiments, the preliminary cement includes from about 0.01 wt % to about 1.0 wt. % ash, in other embodiments less than 1.0 wt %, in other embodiments less than 0.5 wt. %, and in other embodiments less than 0.25 wt % as based on the total solids content of preliminary cement. As those skilled in the art will appreciate, the amount of ash present in the preliminary cement can be determined by various thermal decomposition mass analysis. For example, weighed samples can be heated in covered crucibles (e.g. within a muffle furnace) at 750° C. for 20 minutes, then heated uncovered at 750° C. for three hours, and weighed. Analyses can also be made by Thermogravimetric analysis (TGA). In one such method, a sample is ramped at a rate of 20° C./min from ambient under nitrogen and then held at 250° C. for 20 minutes, then ramped at a rate of 20° C./min to 600° C., nitrogen is replaced by air and held for 10 minutes at 600° C., and then ramped to 750° C. and held for five minutes, at which time the sample is weighed and ash calculated based upon residual weight.

In various embodiments, the method for producing a polyisoprene latex dispersion includes extracting guayule plant material in a solvent mixture including at least one hydrocarbon solvent and at least one polar organic solvent to produce a miscella; fractionating the miscella to obtain a preliminary cement including cis-1,4-polyisoprene rubber in at least one organic solvent; diluting the preliminary cement including cis-1,4-polyisoprene rubber to a cement including cis-1,4-polyisoprene rubber dissolved in at least one organic solvent; dispersing the cement into an aqueous surfactant mixture to produce an emulsion; and removing the at least one organic solvent from the emulsion to produce the polyisoprene latex dispersion. In various embodiments, these steps may include combinations of the various elements set forth and discussed herein. In various embodiments, the step of fractionating further includes multistage countercurrent fractionation with concomitant addition of at least one polar organic solvent to produce a preliminary cement including cis-1,4-polyisoprene rubber in at least one organic solvent. In various embodiments, multistage countercurrent fractionation includes addition of acetone. In various embodiments, fractionation of the miscella includes precipitation of a swollen rubber mass from the miscella by addition of at least one polar organic solvent such as acetone, and re-dissolving the swollen rubber mass in at least one organic solvent to produce the preliminary cement.

Optional Step of Diluting the Preliminary Cement

As indicated above, the process may include the optional step of diluting the preliminary cement to a cement for dispersion. In one or more embodiments, the cement for dispersion includes a final solids level of from about 5 wt % to about 25 wt % cis-1,4-polyisoprene rubber. In various embodiments, the preliminary cement is diluted to a cement including less than or equal to 20 wt % cis-1,4-polyisoprene rubber, in other embodiments less than less than or equal to 15 wt % cis-1,4-polyisoprene rubber, and in other embodiments less than or equal to 10 wt % cis-1,4-polyisoprene rubber. In various embodiments, the preliminary cement is diluted to a cement including from about 5 wt % to about 10 wt % cis-1,4-polyisoprene rubber, in other. In various embodiments, the step of diluting the preliminary cement includes diluting the preliminary cement with hexanes (e.g., iso-hexane), or diluting the preliminary cement with a blend of solvents (e.g. a blend of iso-hexane, cyclohexane and acetone).

Optional De-Solventizing of Preliminary Cement

In one or more embodiments, the preliminary cement is de-solventized. Practice of these embodiments of the invention are not necessarily limited by the methods used to remove solvent from the preliminary cement. The skilled person will appreciate that several methods can be used to remove the solvent from the preliminary cement and thereby provide a de-solventized rubber, which may also be referred to as a dried rubber. In one or more embodiments, the de-solventized rubber includes less than 5 wt %, in other embodiments less than 2 wt %, and in other embodiments less than 0.5 wt % solvent (e.g. less than 0.25 weight percent volatile organic compounds).

According to these embodiments, de-solventized rubber can then be dissolved in a solvent to form the cement for dispersing. For example, the de-solventized rubber can be dissolved in a mixture of non-polar and polar organic solvent to produce a rubber cement usable in the dispersion process. As with other embodiments, the solids content of the cement can be further adjusted with solvent to produce a cement usable in the dispersion process. Those skilled in the art will appreciate that the step of de-solventizing the preliminary cement and then later dissolving the de-solventized cement allows for storage, shipment, and handling of the rubber obtained from guayule (e.g. extraction and fractionation) in the absence of solvent (e.g. volatile organic compounds) and then subsequently forming the cement useful for dispersing.

Characteristics of the Cement for Dispersing

In various embodiments, the cement prior to dispersion includes from about 5 wt % to about 25 wt % cis-1,4-polyisoprene rubber. In various embodiments, the cement prior to dispersion comprises less than or equal to about 20 wt % cis-1,4-polyisoprene rubber, in other embodiments less than or equal to about 15 wt % cis-1,4-polyisoprene rubber, in other embodiments less than or equal to about 10 wt % cis-1,4-polyisoprene rubber, and in other embodiments from about 5 wt % to about 10 wt % cis-1,4-polyisoprene rubber.

In various embodiments, the cement includes a hydrocarbon solvent, which includes non-polar and polar hydrocarbon solvents. In particular embodiments, the cement includes a mixture of non-polar and polar solvents (which may also be referred to as polar organic solvents).

In one or more embodiments, the non-polar hydrocarbon solvent may include $C_5$ to $C_{10}$ straight chain hydrocarbons, $C_5$ to $C_{10}$ branched chain hydrocarbons, $C_5$ to $C_{10}$ cyclic hydrocarbons, $C_6$ to $C_{10}$ aromatic hydrocarbons, and mixtures thereof. In various embodiments, particular combinations of solvents provide an azeotropic mixture, thus simplifying removal of the solvents at a later stage.

In particular embodiments, the non-polar hydrocarbon solvent includes a pentane such as cyclopentane, n-pentane, iso-pentane, neo-pentane, and mixtures thereof. In these or other embodiments, the non-polar hydrocarbon solvent includes a hexane such as n-hexane, iso-hexane, 3-methyl-pentant, 2,3-dimethylbutane, neo-hexane, cyclohexane, and mixtures thereof. In these or other embodiments, the non-polar hydrocarbon solvent includes a $C_6$ to $C_{10}$ aromatic hydrocarbon such as benzene, toluene, o-xylene, m-xylene, p-xylene, ethylbenzene, 1,2,3-trimethylbenzene, 1,2,4-trimethylbenzene, mesitylene, 2-ethyltoluene, 3-ethyltoluene, 4-ethyltoluene, and mixtures thereof.

In these or other embodiments, the hydrocarbon solvent includes a polar organic solvent such as acetone, $C_1$-$C_4$ alcohols, $C_2$-$C_4$ diols, and mixtures thereof.

In exemplary embodiments, the solvent in the cement prior to dispersion includes pentanes, and/or hexanes, and/or acetone, and/or a mixture of acetone and hexanes, and/or iso-hexane, and/or acetone and iso-hexane, and/or iso-hexane, cyclohexane and acetone.

In one or more embodiments, the solvent of the cement for dispersing into the aqueous surfactant mixture is characterized by the weight ratio of polar solvent to non-polar solvent. This can be quantified based upon the weight of polar solvent present relative to the total weight of polar and non-polar solvent. In one or more embodiment, the cement for dispersing into the aqueous surfactant mixture includes from about 20 to about 55 wt %, in other embodiments from about 30 to about 50 wt %, and in other embodiments from about 35 to about 45 wt % polar solvent, based on the total weight of the solvent (i.e. the total weight of polar and non-polar solvent combined). In one or more embodiments, the cement for dispersing into the aqueous surfactant mixture includes greater than 20 wt %, in other embodiments greater than 25 wt %, and in other embodiments greater than 30 wt % polar solvent based on the total weight of the solvent.

Preparing the Aqueous Surfactant Mixture

As indicated above, the process includes preparing a aqueous surfactant mixture. In various embodiments, the aqueous surfactant mixture includes a surfactant in water. In various embodiments, the total amount of surfactant present in the aqueous surfactant mixture may be from about 0.01 wt % to about 20.0 wt %. In various embodiments, the surfactant may include anionic surfactants, nonionic surfactants, cationic surfactants, amphoteric surfactants, and mixtures thereof.

Anionic surfactants for use herein include, but are not limited to, alkyl sulfates, also known as alcohol sulfates. These surfactants have the general formula R—O—SO$_3$M, where R is from about 10 to 18 carbon atoms, and M represents an alkali metal such as sodium or potassium or ammonium, and these materials may also be denoted as sulfuric monoesters of $C_{10}$-$C_{18}$ alcohols, examples being sodium decyl sulfate, sodium palmityl alkyl sulfate, sodium myristyl alkyl sulfate, sodium dodecyl sulfate, sodium tallow alkyl sulfate, sodium coconut alkyl sulfate, and mixtures of these surfactants, or of $C_{10}$-$C_{20}$ oxo alcohols, and those monoesters of secondary alcohols of this chain length. Also useful are the alk(en)yl sulfates of said chain length which contain a synthetic straight-chain alkyl radical prepared on a petrochemical basis, these sulfates possessing degradation properties similar to those of the corresponding compounds based on fatty-chemical raw materials. From an emulsification standpoint, $C_{12}$-$C_{16}$-alkyl sulfates, $C_{12}$-$C_{15}$-alkyl sulfates, and also $C_{14}$-$C_{15}$ alkyl sulfates, are all useful. For example, sodium lauryl sulfate from the Stepan Company sold under the trade name of Polystep® can be used.

Fatty soaps may also be used in the aqueous surfactant mixture to aid emulsification. As used here, "fatty soap" means the salts of fatty acids. For example, the fatty soaps that may be used here have general formula R—CO$_2$M, wherein R represents a linear or branched alkyl or alkenyl group having between about 8 and 24 carbons and M represents an alkali metal such as sodium or potassium or ammonium or alkyl- or dialkyl- or trialkyl-ammonium or alkanol-ammonium cation. The fatty acid soaps for use herein may be comprised of higher fatty acid soaps. That fatty acids that may be the feed stock to the fatty soaps may be obtained from natural fats and oils, such as those from animal fats and greases and/or from vegetable and seed oils, for example, tallow, hydrogenated tallow, whale oil, fish oil, grease, lard, coconut oil, palm oil, palm kernel oil, olive oil, hemp oil, jojoba oil, peanut oil, corn oil, sesame oil, rice bran oil, cottonseed oil, babassu oil, soybean oil, castor oil, and mixtures thereof. Fatty acids can be synthetically prepared, for example, by the oxidation of petroleum, or by hydrogenation of carbon monoxide by the Fischer-Tropsch process. The fatty acids for use in the aqueous surfactant mixture include linear or branched and containing from about 8 to about 24 carbon atoms, preferably from about 10 to about 20 carbon atoms and most preferably from about 14 to about 18 carbon atoms. Fatty acids for use in the aqueous surfactant mixture include coconut, palm kernel, hemp oil, and/or jojoba oil fatty acids, and their preferred salts (soaps) therefrom are alkali metal salts, such as sodium or potassium or mixtures thereof. Other fatty soaps are ammonium and alkanol-ammonium salts of fatty acids. Useful, commercially available fatty soaps include potassium laurate, ammonium laurate and potassium oleate.

Other suitable anionic surfactants include the sulfonate and sulfate types. Sulfonate type anionic surfactants include $C_{9-13}$ alkyl benzenesulfonates, olefin sulfonates, hydroxy alkane sulfonates and disulfonates, as are obtained, for example, from $C_{12-18}$ monoolefins having a terminal or internal double bond by sulfonating with gaseous sulfur trioxide followed by alkaline or acidic hydrolysis of the sulfonation products. Anionic surfactants that may find use in the aqueous surfactant mixture include the alkyl benzene sulfonate salts. Suitable alkyl benzene sulfonates include the sodium, potassium, ammonium, lower alkyl ammonium and lower alkanol ammonium salts of straight or branched-chain alkyl benzene sulfonic acids. Alkyl benzene sulfonic acids useful as precursors for these surfactants include decyl benzene sulfonic acid, undecyl benzene sulfonic acid, dodecyl benzene sulfonic acid, tridecyl benzene sulfonic acid, tetrapropylene benzene sulfonic acid and mixtures thereof. Examples of commercially available alkyl benzene sulfonic acids include Calsoft® LAS-99, Calsoft® LPS-99 or Calsoft® TSA-99 marketed by Pilot Chemical. Also, of use is sodium dodecylbenzene sulfonate, available commercially as the sodium salt of the sulfonic acid, for example Calsoft® F-90, Calsoft® P-85, Calsoft® L-60, Calsoft® L-50, or Calsoft® L40. Also usable are the ammonium salts, lower alkyl ammonium salts and the lower alkanol ammonium salts of linear alkyl benzene sulfonic acid, such as triethanol ammonium linear alkyl benzene sulfonate including Calsoft® T-60 sold by Pilot Chemical.

Also, anionic surfactants useful in the aqueous surfactant mixture include the alkyl ether sulfates, also known as alcohol ether sulfates. Alcohol ether sulfates are the sulfuric monoesters of the straight chain or branched alcohol ethoxylates and have the general formula $R$—$(CH_2CH_2O)_x$—$SO_3M$, where $R$—$(CH_2CH_2O)_x$— may comprise a $C_7$-$C_{21}$ alcohol ethoxylated with from about 0.5 to about 9 mol of ethylene oxide (x=0.5 to 9 EO), such as $C_{12}$-$C_{18}$ alcohols containing from 0.5 to 9 EO, and where M is alkali metal or ammonium, alkyl ammonium or alkanol ammonium counterion. Alkyl ether sulfates for use herein include $C_8$-$C_{18}$ alcohol ether sulfates with a degree of ethoxylation of from about 0.5 to about 9 ethylene oxide moieties, for example the $C_{12}$-$C_{15}$ alcohol ether sulfates with ethoxylation from about 4 to about 9 ethylene oxide moieties, with 7 ethylene oxide moieties. It is understood that when referring to alkyl ether sulfates, these substances are already salts (hence designated "sulfonate"), and most preferred and most readily available are the sodium alkyl ether sulfates (also referred to as NaAES). Commercially available alkyl ether sulfates include the CALFOAM® alcohol ether sulfates from Pilot Chemical, the EMAL®, LEVENOL® and LATEMAL® products from Kao Corporation, and the POLYSTEP® products from Stepan, however most of these have fairly low EO content (e.g., average 3 or 4-EO). Alternatively, the alkyl ether sulfates for use in the aqueous surfactant mixtures may be prepared by sulfonation of alcohol ethoxylates (i.e., nonionic surfactants) if the commercial alkyl ether sulfate with the desired chain lengths and EO content are not easily found, but perhaps where the nonionic alcohol ethoxylate starting material may be. For example, sodium lauryl ether sulfate ("sodium laureth sulfate," having about 3 ethylene oxide moieties) is readily available commercially.

In various embodiments, the aqueous surfactant mixture used in the dispersion step comprises sodium lauryl sulfate. In various embodiments, the aqueous surfactant mixture comprises from about 0.01 wt % to about 5.0 wt % sodium lauryl sulfate in water, or in other embodiments from about 0.1 wt % to about 2.0 wt % sodium lauryl sulfate in water.

In various embodiments, the aqueous surfactant mixture is pH adjusted with alkali to a final pH of from about 10 to about 11. Any alkaline agent can be used for this pH adjustment, such as NaOH or KOH.

Dispersing the Cement and the Aqueous Surfactant Mixture

As indicated above, the processes of this disclosure includes dispersing the rubber cement and the aqueous surfactant mixture. According to embodiments of this disclosure, the rubber cement is dispersed into the aqueous surfactant mixture using high shear. In one or more embodiments, the shear under which emulsification (i.e. dispersing the cement into the aqueous phase) takes place is greater than 20,000 rad/sec, in other embodiments greater than 40,000 rad/sec, in other embodiments greater than 50,000 rad/sec, and in other embodiments greater than 60,000 rad/sec.

In one or more embodiments, emulsification under high shear is accomplished by inline high-shear mixing (which may also be referred to as high shear inline mixing). Devices for inline high-shear mixing are known to those having skill in the art. For example, motorized, inline high-shear mixers are sold under the tradename Bementek, which are motorized mixers having multiple rotors and stators that can achieve a tip speed of from about 3000 feet/min to about 4000 feet/min. With this and other mixers, dispersing may be conducted at ambient temperature and at a pressure of from about 1 to about 100 PSIG. In various embodiments, the step of dispersing includes introducing the cement to an aqueous surfactant mixture upstream of the mixer and then pumping the mixture through an inline high-shear mixer. Other useful devices include inline homogenizers. Still other devices include those operating on ultrasound mixing energy.

In one or more embodiments, the cement is incrementally dosed to the aqueous surfactant mixture and then subsequently dispersed under high shear. In one or more embodiments, the weight ratio cement that is incrementally dosed into the aqueous surfactant mixture less than 1:5, in other embodiments less than 1:20, in other embodiments less than 1:50 (it being understood that 1:100 is less than 1:50). In one or more embodiments, the weight ratio cement that is incrementally dosed into the aqueous surfactant mixture is from about 1:200 to about 1:5, in other embodiments from about 1:150 to about 1:10, and in other embodiments from about 1:120 to about 1:50.

In particular embodiments, dispersing takes place using an inline high-shear mixer operating in conjunction with a recycle loop that provides for batch emulsification. This configuration can be described with reference to FIG. 2, which depicts an emulsification system 210 including inline high-shear mixing device 210 in fluid communication with conduit loop 214, which is also in fluid communication with tank 218. During operation, water and surfactant, optionally pre-blended, are introduced to system 210, for example by introducing water and surfactant to tank 218. A portion of the material (e.g. water and surfactant) within tank 218 is circulated through conduit loop 214 by, for example, a pump 216. The cement is introduced to the aqueous surfactant mixture upstream of inline high-shear mixing device 210 and dispersed, under high shear, within device 210, and then the emulsified blend is returned to tank 218 via conduit loop 214. As the skilled person will appreciate, system 210 operates as a batch whereby material within the system is recycled through the system so that the materials underdo multiple emulsifications within mixing device 210. It will also be appreciated that the system provides for the incremental addition of the cement to the aqueous surfactant mixture. It will also be appreciated that this system provides for the incremental addition of cement to an existing or previously emulsified composition.

In other embodiments, the process for dispersing the cement into the aqueous surfactant mixture can be adapted to a continuous system. For example, tank 218 can be a continuously stirred tank reactor (CSTR) that achieve steady-state conditions thereby allowing removal of the desired emulsion with contemporaneous input of water and surfactant while operating within system 210.

In various embodiments, the step of dispersing comprises high shear inline mixing of the aqueous surfactant mixture and the cement at a weight ratio of from about 5:1 to about 0.15:1. In various embodiments, the weight ratio of aqueous surfactant mixture to cement is from about 2:1 to about 0.5:1. In various embodiments, the weight ratio of aqueous surfactant mixture to cement is about 1:1.

Characteristics of Latex Emulsion

In various embodiments, the step of dispersing the rubber cement and the aqueous surfactant mixture provides a latex emulsion having from about 3 wt % to about 7 wt % rubber content, or in other embodiment from about 4 wt % to about 5 wt % rubber content prior to the step of desolventization.

Optional Step of Adding an Antioxidant

As indicated above, an antioxidant may optionally be added to the aqueous surfactant mixture, the cement, the emulsion obtained after dispersing the cement in the aqueous surfactant mixture, or a combination of two or more thereof. In various embodiments, the antioxidant may be added in an amount of from about 0.01 wt % to about 5.0 wt % active antioxidant based on the total weight of the emulsion.

In various embodiments, the antioxidant may include a non-staining antioxidant, and is capable of mitigating the effects of oxygen, heat, light, and/or ozone. In general, antioxidants for use herein include an antioxidant selected from the group consisting of phenolics, phosphates, thio-esters, amines, diphenylamine-ketone condensates, and mixtures thereof. Of interest herein are antioxidants comprising an aqueous dispersion of butylated reaction products from p-cresol and dicyclopentadiene. In various embodiments, the antioxidant for use herein includes a 50-55 wt % solids aqueous dispersion of p-cresol/dicyclopentadiene butylated reaction products. This particular non-staining antioxidant is available from Akron Dispersions, Akron, Ohio, USA under the brand name Bostex 24/Wingstay L aq. disp. (51.2-53.2% solids), or from Aquaspersions®, Halifax, West Yorkshire, England, under the brand name Aquanox® L-Superfine (52% solids), amongst other suppliers. In various embodiments, from about 0.1 to about 2.0 wt % of Aquanox® L (resulting in about 0.05 wt % to about 1.0 wt % active antioxidant) is added to the resulting latex emulsion, based on the total weight of the emulsion, prior to the step of de-solventization of the emulsion. Addition of antioxidant to the latex emulsion improves shelf life and molecular weight stability and preservation of both the latex emulsion and the resulting latex dispersion after the de-solventization step.

Desolventizing the Emulsion

As indicated above, the processes of the present disclosure include the step of removing the hydrocarbon solvent, or at least a substantial portion thereof, from the emulsion to thereby produce the polyisoprene latex dispersion. This step may be referred to a as desolventizing step.

In one or more embodiments, the step of removing the hydrocarbon solvent includes distilling the hydrocarbon solvent from the emulsion. In one or more embodiments, vacuum distillation techniques are employed, which may be referred to as removal of volatile solvent in vacuo. As those skilled in the art will appreciate, distillation of the hydrocarbon solvent may include various combinations of heat and vacuum to achieve the desired removal (e.g. essentially complete removal) of the hydrocarbon solvent from the emulsion, and those having skill in the art will be able to readily ascertain the conditions necessary to achieve a desired removal of the hydrocarbon solvent.

In one or more embodiments, the step of removing the hydrocarbon solvent includes heating the emulsion to a temperature between ambient and less than about 215° F., in other embodiments between ambient and less than about 190° F., or in other embodiments less than about 170° F. In one or more embodiments, the step of removing takes place at temperature below those temperatures that would otherwise have a deleterious impact on the polymer properties (e.g. temperatures that preserve molecular weight). In various embodiments of the desolventization step, less than 20% degradation, or in other embodiments less than 15% degradation, in the molecular weight of the polymer is observed.

In one or more embodiments, the step of removing hydrocarbon solvent includes, optionally in combination with heating the emulsion, reducing the pressure exerted on the emulsion (i.e. pulling a vacuum on the emulsion). In one or more embodiments, the step of desolventizing includes reducing the pressure exerted on the emulsion to a pressure of less than 1 atm (<760 Torr), in other embodiments less than 0.3 atm, and in other embodiments less than 0.2 atm. For example, the step of removing the hydrocarbon solvent may take place by heating the emulsion to a temperature of from about 90° F. to about 110° F. while pulling a vacuum of about 120 to about 150 Torr.

In one or more embodiments, the step of desolventizing may include removal of a hexanes/acetone azeotrope, an iso-hexane/acetone azeotrope, a cyclohexane/acetone azeotrope, or combinations thereof. In various embodiments, the removing step may include removal of pentanes in vacuo. In various embodiments, the removing step may include removal of hexanes in vacuo. In various embodiments, the removing step may include removal of iso-hexane in vacuo. In various embodiments, the removing step may include removal of cyclohexane in vacuo. In various embodiments, the removing step may include removal of iso-hexane, cyclohexane and acetone from the emulsion in vacuo. In various embodiments, the removing step may include removal of an azeotropic mixture of solvents in vacuo.

In one or more embodiments, the step of desolventizing includes removing greater than 90 wt %, in other embodiments greater than 95 wt %, in other embodiments greater than 98 wt %, and in other embodiments greater than 99.5 wt % of the hydrocarbon solvent present in the emulsion. In particular embodiments, substantially all of the hydrocarbon solvent present in the emulsion is removed, which refers removal of that amount of solvent that would otherwise have an appreciable impact on the latex dispersion. In one or more embodiments, essentially all of the hydrocarbon solvent is removed (i.e. at most de minimus amounts of hydrocarbon solvent are present).

The step of desolventization results in an aqueous latex dispersion having a solids level of from about 7 wt % to about 10 wt % rubber solids, which is generally too low of a rubber content for use in dip-molding. Therefore, the resulting aqueous latex dispersion from the desolventization step may be further manipulated to concentrate the weight percent solids level to a level of rubber that is more appropriate for a commercial latex, as discussed herein.

In various embodiments, the step of desolventizing can include adding an optional defoamer to the latex emulsion prior to desolventization (e.g. prior to heating and providing a vacuum to the emulsion). In some instances, the heat and reduced pressure conditions for de-solventization result in foaming, which can be mitigated by the presence of an antifoam or defoamer. Various silicone antifoams and defoamers for this purpose are available from Dow, Inc., Midland, MI, USA. In the presence of an antifoam or defoamer, desolventization of a latex emulsion can result in an aqueous latex dispersion comprising as much as about 60-61 wt % solids, reducing or eliminating the need for concentrating by centrifugation.

In various embodiments, the step of desolventizing can include adding an optional thickener to the latex emulsion. Exemplary thickeners include acrylate polymers such as those sold under the tradename Acrysol by Dow, Inc., Midland, MI, USA. In various embodiments, the presence of a thickener can result in an aqueous latex dispersion having as much as about 60-61 wt % solids, reducing or eliminating the need for concentrating by centrifugation. A thickener can also be used in addition to concentrating by centrifugation.

The removing step does not need to include a recycling of the emulsion to accomplish the desired level of solvent removal, particularly if the removal of solvent is aided by the use of an azeotropic mixture. In contrast to the solvent removing step herein, examples of recycling to achieve removal of hydrocarbon solvent may be found described in P. J. Wan, et al., "Alternative Hydrocarbon Solvents for Cottonseed Extraction," JAOCS, 72(6) 653 (1995).

Adjusting the Weight Percent Solids Level in a
Dispersion Obtained from Desolventization of a
Latex Emulsion In various embodiments, a method for producing a polyisoprene latex dispersion further comprises the step of adjusting the final weight percent rubber solids level in the latex dispersion obtained from desolventization to a desired level, such as to a solids level amenable to commercial dip-molding processes. As discussed, the desolventization step may result in an aqueous latex dispersion having a rubber content of from about 7 wt % to about 10 wt % rubber solids, unless defoamers or thickeners are used to mitigate foaming and to allow azeotropic or standard in vacuo removal of some of the water. In various embodiments, concentration of an aqueous latex emulsion having a beginning rubber content of from about 7 wt % to about 10 wt % rubber solids comprises centrifugation.

In various embodiments, the step of adjusting the weight percent solids level of the resulting aqueous latex dispersion to produce the final latex comprises combinations of centrifugation to produce layers, decanting or otherwise separating layers, and re-diluting with water. In various embodiments, the step comprises at least one sequence of (i) centrifuging the aqueous latex dispersion to produce two layers, a top layer comprising a high rubber solids content and a bottom water layer; (ii) separating the two layers; and (iii) diluting the top layer with water to the desired target percent rubber solids level. This sequence can be repeated as many times as necessary to achieve a desired weight percent solids level of from about 40 wt % to about 70 wt %. In various embodiments, the targeted weight percent solids level is from about 45 wt % to about 65 wt %. In various embodiments, the targeted weight percent solids level is from about 50 wt % to about 60 wt %. In various embodiments, the targeted weight percent solids level is about 57 wt %, each based on the total weight of the aqueous latex.

Concentration of the aqueous dispersion can take place by any number and combination of centrifugation into layers, separation of layers, keeping the upper high solids layer and discarding the lower water layer, and dilution of the top layer with water as necessary to obtain the target level of rubber solids in the aqueous latex dispersion.

In various embodiments, a single centrifugation of the latex dispersion produces two layers, a brownish lower water layer and an upper high rubber solids content aqueous dispersion. The layers are then separated, the bottom brown water layer discarded, and the upper high solids layer diluted as necessary with water to the desired weight percent solids level of from about 40 wt % to about 70 wt % rubber solids. For example, a first centrifugation may provide a top layer having a solids level of >70 wt %, which can then be diluted down to about 40-70 wt %, or to about 45-65 wt %, or to about 50-60 wt % rubber solids.

Process Characteristics

The process of the present disclosure results in an aqueous latex dispersion having an advantageous amount of solids prior to concentrating the latex (e.g. by centrifugation). In one or more embodiments, the solids level of the latex dispersion, prior to concentrating the latex, is greater than 5 wt %, in other embodiments greater than 8 wt %, in other embodiments greater than 12 wt %, and in other embodiments greater than 15 wt % solids.

The process of the present disclosure advantageously provides for high emulsion yield, which refers to the percentage of rubber that is contained in the starting cement that ultimately is dispersed in the aqueous latex. In one or more embodiments, the emulsion yield achieved by practice of the embodiments of this disclosure is greater than 90%, in other embodiments greater than 95%, in other embodiments greater than 98%, and in other embodiments greater than 99%.

The efficiency of the processes of the present disclosure can also be quantified based upon the weight percent of rubber yield loss (i.e. the weight percentage of rubber contained within the cement and not present in the final aqueous dispersion). In one or more embodiments, the rubber loss resulting from practice of the embodiments of this disclosure is less than 10%, in other embodiments less than 5%, in other embodiments less than 2%, and in other embodiment less than 1%.

Industrial Applicability

In one or more embodiments, the latexes prepared according to aspects of this disclosure are suitable for use in the preparation of foam rubber, coating compositions, emulsion paints, cosmetics, rubber dams, adhesives, elastic bands, elastic traps, automobile tires, truck tires, airplane tires, wet suits, binders, and especially dipped goods such as gloves (e.g. surgical gloves), condoms, and tubing (e.g. catheters), and angioplasty balloons.

EXAMPLE

Guayule shrubs were harvested, dried and extracted by regular solvent extraction to form a miscella followed by multistage fractionation of the miscella to form a cement. The cement was diluted with hexanes (e.g., iso-hexane), or a blend of iso-hexanes, cyclohexane and acetone, to about 10 wt % rubber solids. A separate aqueous mixture was prepared comprising about 0.1 to about 2.0 wt % sodium lauryl sulfate in softened water. The pH of this aqueous surfactant mixture was adjusted to between 10-11 with potassium hydroxide (KOH). The latex emulsion was formed by pumping the aqueous surfactant mixture through a high shear inline mixer/homogenizer while dosing in the cement upstream. For this step, an inline high shear Bemantek dynamic mixer with multiple rotor and stators was used, with a tip speed adjusted to about 3750 feet/min. The dispersing was conducted at ambient temperature and at a pressure of about 1-50 PSIG. The overall ratio of aqueous surfactant mixture to cement was about 1:1.

After the step of forming the dispersion, about 0.1 to about 2.0 wt % of a 52 wt % solids solution of the butylated reaction products formed between p-cresol and dicyclopentadiene was added to the latex dispersion. This non-staining antioxidant is available from Aquaspersions®, Halifax, West Yorkshire, England, under the brand name Aquanox® L. The hexanes and acetone were removed from the dispersion at a temperature of <170° F. and under reduced pressure to produce a latex dispersion. The solids level of the resulting aqueous latex dispersion was then adjusted by centrifugation, separation of layers, and dilution of the high solids upper layer with softened water previously adjusted to pH 10-11. The final rubber solids level in the latex dispersion was about 57 wt %. The resulting aqueous latex dispersion had the following physical properties: Final rubber solids 40-60 wt %, ideally 57 wt % with adjustment by centrifugation as described herein; Viscosity=7.74 cps @ 40 wt % solids; 17.82 cps @ 50 wt % solids; 44.60 cps @ 55 wt % solids; and 2505.0 cps @62 wt % solids, indicating variability in viscosity with solids level; Average molecular weight of the polyisoprene in the dispersion=600,000 to 1,300,000 Dalton in a single mode distribution; Mean particle size=1250 nm (1.25 μm); median particle size=925 nm; mode=506 nm. Therefore, the mode/median ratio is calculated to be 0.547.

The detailed description of exemplary embodiments makes reference to the accompanying drawings, which show exemplary embodiments by way of illustration and their best mode. While these exemplary embodiments are described in sufficient detail to enable those skilled in the art to practice the invention, it should be understood that other embodiments may be realized and that logical, chemical, and mechanical changes may be made without departing from the spirit and scope of the inventions. Thus, the detailed description is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled or the like may include permanent (e.g. integral), removable, temporary, partial, full, and/or any other possible attachment option. Any of the components may be coupled to each other via friction, snap, sleeves, brackets, clips or other means now known in the art or hereinafter developed. Additionally, any reference to without contact (or similar phrases) may also include reduced contact or minimal contact.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." The phrase "as least one" shall be interpreted to include "a" in the singular or more than one, and the use of the phrase "at least one" shall be used to construe the term "a" and requiring any element in the singular. Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described various embodiments that are known to those of ordinary skill in the art are expressly incorporated herein by reference and are intended to be encompassed by the present claims. Moreover, it is not necessary for an apparatus or component of an apparatus, or method in using an apparatus to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a chemical, chemical composition, process, method, article, or apparatus that comprises a list of elements does not include only those elements but may include other elements not expressly listed or inherent to such chemical, chemical composition, process, method, article, or apparatus.

The invention claimed is:

1. A method for producing a polyisoprene latex dispersion, the method comprising:

(i) extracting guayule plant material in a solvent to produce a miscella;

(ii) fractionating the miscella to obtain a preliminary cement;

(iii) diluting the preliminary cement with a mixture of polar and non-polar hydrocarbon solvent to produce a rubber cement for dispersing, where the rubber cement includes from about 5 wt % to about 10 wt % natural cis-1,4-polyisoprene rubber;

(iv) circulating water and a surfactant through a circulation system including a continuously stirred tank in fluid communication with a circulation loop including an inline high-shear mixing device, where the water and surfactant mix to form an aqueous surfactant mixture;

(v) maintaining the continuously stirred tank at steady state conditions;

(vi) dispersing the rubber cement into the aqueous surfactant mixture circulating through the circulation system to produce a biphasic latex emulsion, where said step of dispersing is controlled to introduce the rubber cement at a weight ratio of rubber cement to water and surfactant within the aqueous surfactant mixture of from about 1:200 to about 1:5 to thereby form the biphasic latex emulsion;

(vii) homogenizing the biphasic latex emulsion within inline high-shear mixing device while the biphasic latex emulsion circulates through the circulation system;

(viii) removing a portion of the biphasic latex emulsion from the circulation system; and (ix) removing organic solvent from the biphasic latex emulsion removed in said step of removing a portion of the biphasic latex emulsion to thereby form a latex wherein the natural cis-1-4, polyisoprene is dispersed within water, and where the method yields less than 10% rubber loss.

2. The method of claim 1, further comprising adjusting rubber solids in the polyisoprene latex dispersion to produce a polyisoprene latex having a target percent rubber solids level of from about 40 wt % to about 70 wt %, based on the total weight of the aqueous polyisoprene latex, the adjusting comprising at least one sequence of: (i) centrifuging the aqueous latex dispersion to produce two layers, a top layer comprising a high rubber solids and a bottom water layer; (ii) separating the two layers; and (iii) diluting the top high rubber solids layer with water to the target percent rubber solids level.

3. A method for producing a polyisoprene latex dispersion, the method comprising:

(i) providing a circulation system including a continuously stirred tank in fluid communication with a circulation loop including an inline high-shear mixing device;

(ii) circulating a fluid through the circulation system, where the fluid includes water and a surfactant;

(iii) maintaining the continuously stirred tank at steady state conditions;

(iv) introducing a rubber cement to the fluid circulating through the circulation system, where the rubber cement includes from about 5 wt % to about 10 wt % natural cis-1,4-polyisoprene rubber dissolved in a mixture of polar and non-polar hydrocarbon solvent, where said step of introducing is controlled to introduce the rubber cement at a weight ratio of rubber cement to water and surfactant within the fluid of from about 1:200 to about 1:5 to thereby form a biphasic mixture;

(v) homogenizing the biphasic mixture within the inline high-shear mixing device while the biphasic mixture circulates through the circulation system;

(vi) removing a portion of the fluid from the circulation system; and (vii) desolventizing the fluid removed from the circulation system to thereby form a latex wherein the natural cis-1-4,polyisoprene rubber is dispersed within water.

4. The method of claim 3, where the surfactant is defined by the formula $R$—$CO_2M$, wherein R represents a linear or branched alkyl or alkenyl group having between about 8 and 24 carbons and M represents an alkali metal or ammonium or alkyl- or dialkyl- or trialkyl-ammonium or alkanol-ammonium cation.

5. The method of claim 4, where M represents sodium or potassium.

6. The method of claim 4, where R is a linear alkyl group.

7. The method of claim 4, where the surfactant is potassium laurate.

* * * * *